May 21, 1946.  R. CHILTON  2,400,538
TRANSMISSION
Original Filed Oct. 14, 1942   5 Sheets-Sheet 1
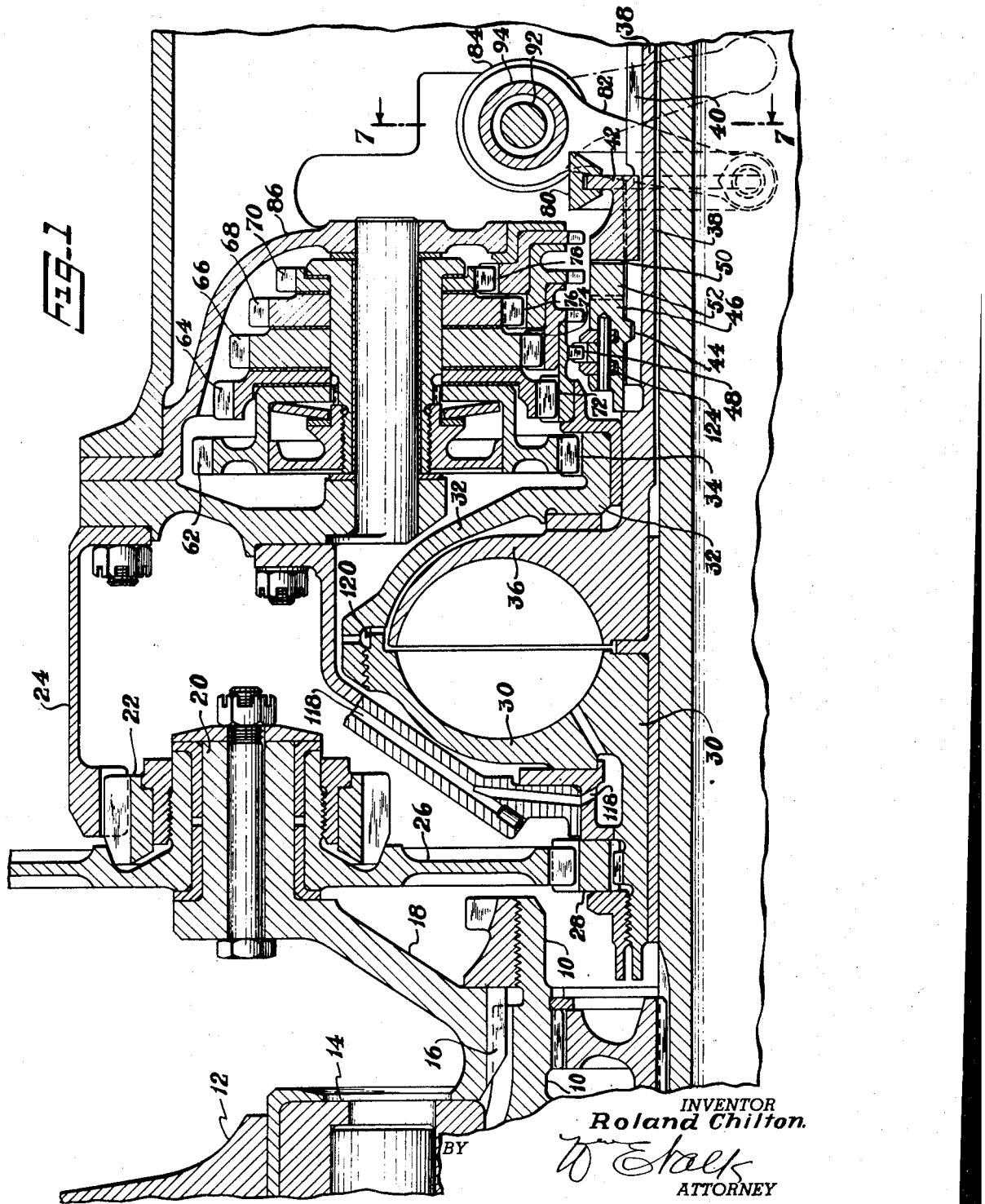
INVENTOR
*Roland Chilton.*
BY
ATTORNEY May 21, 1946.　　　R. CHILTON　　　2,400,538
TRANSMISSION
Original Filed Oct. 14, 1942　　5 Sheets-Sheet 2
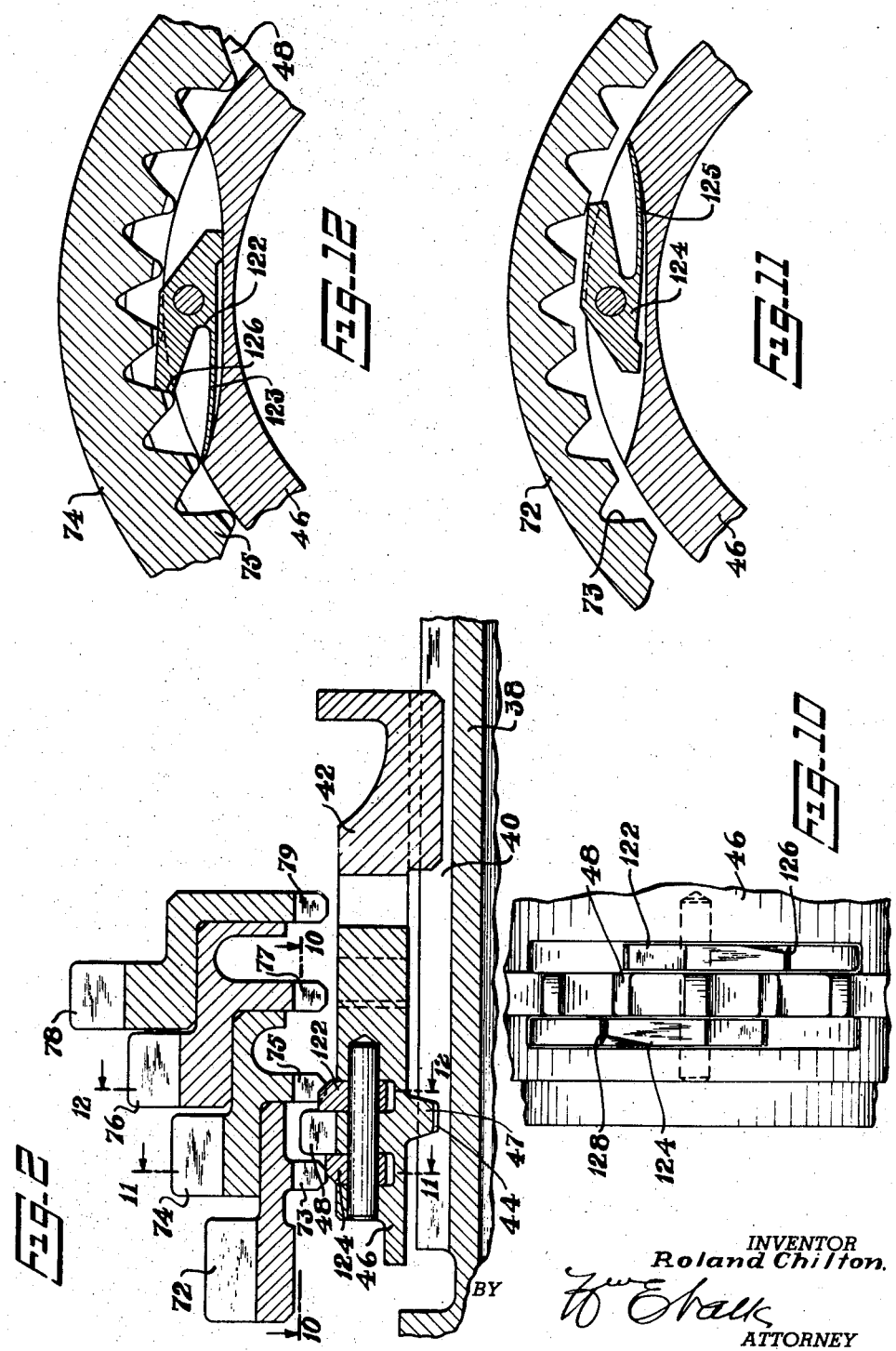
INVENTOR
Roland Chilton.
BY
ATTORNEY

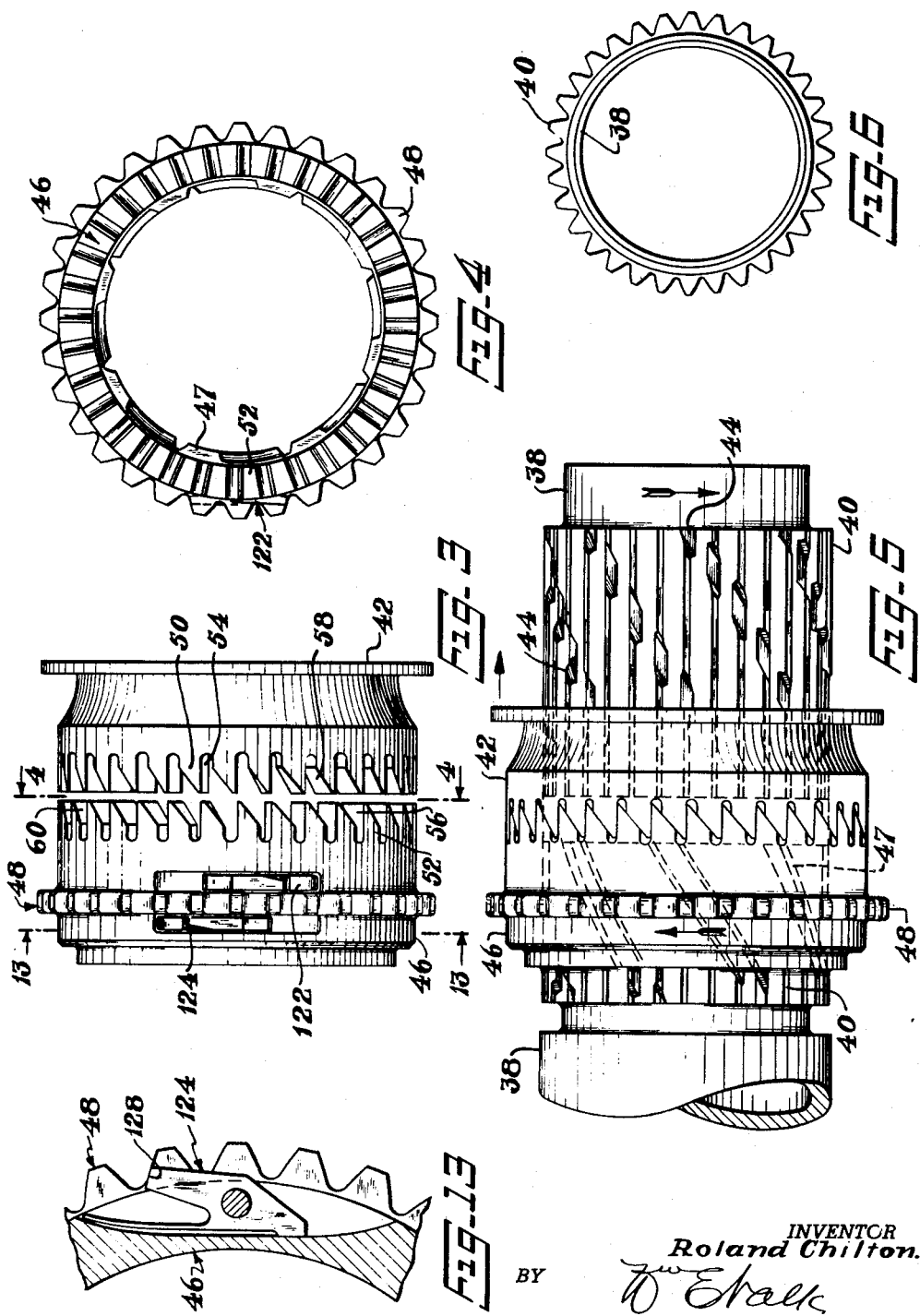

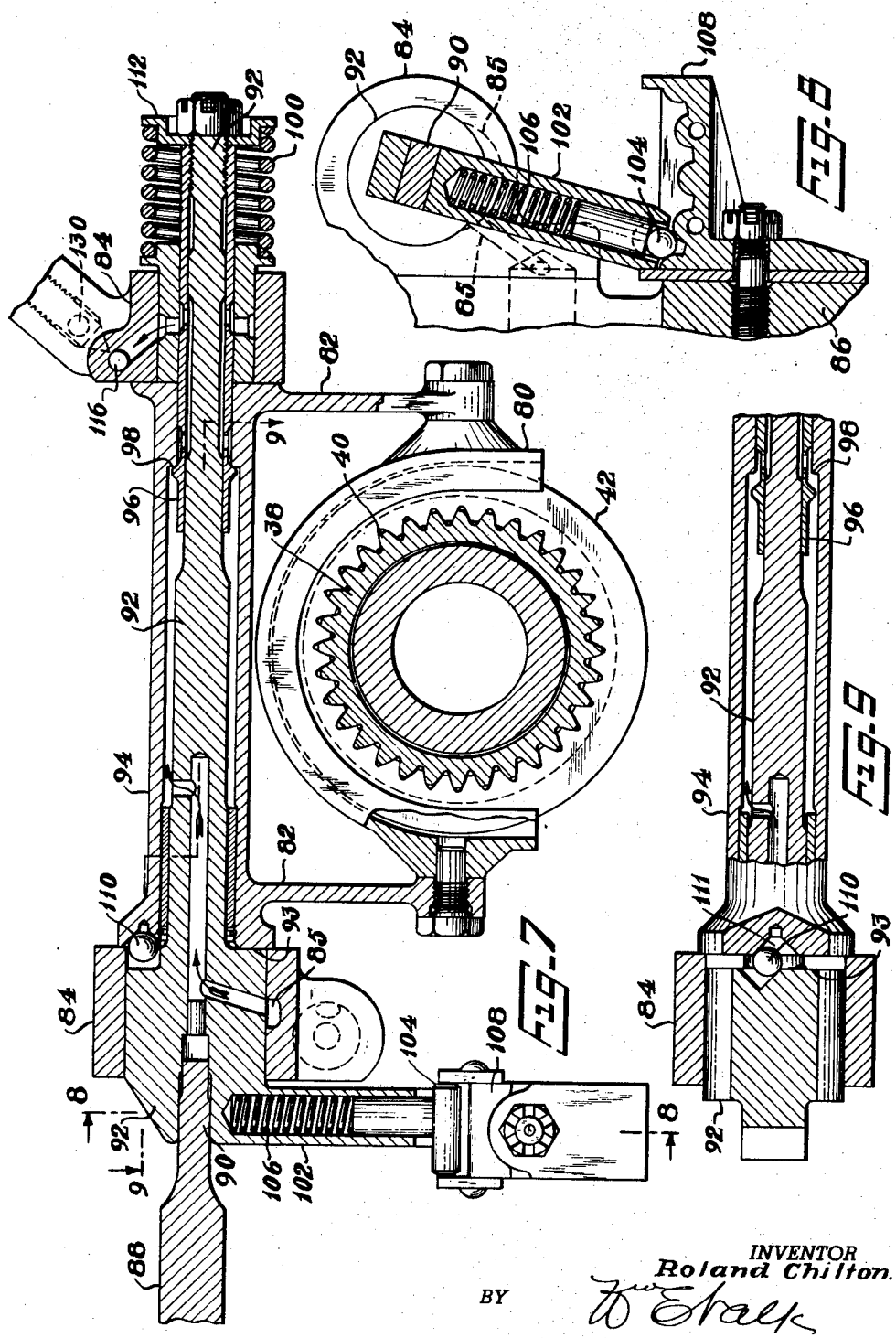

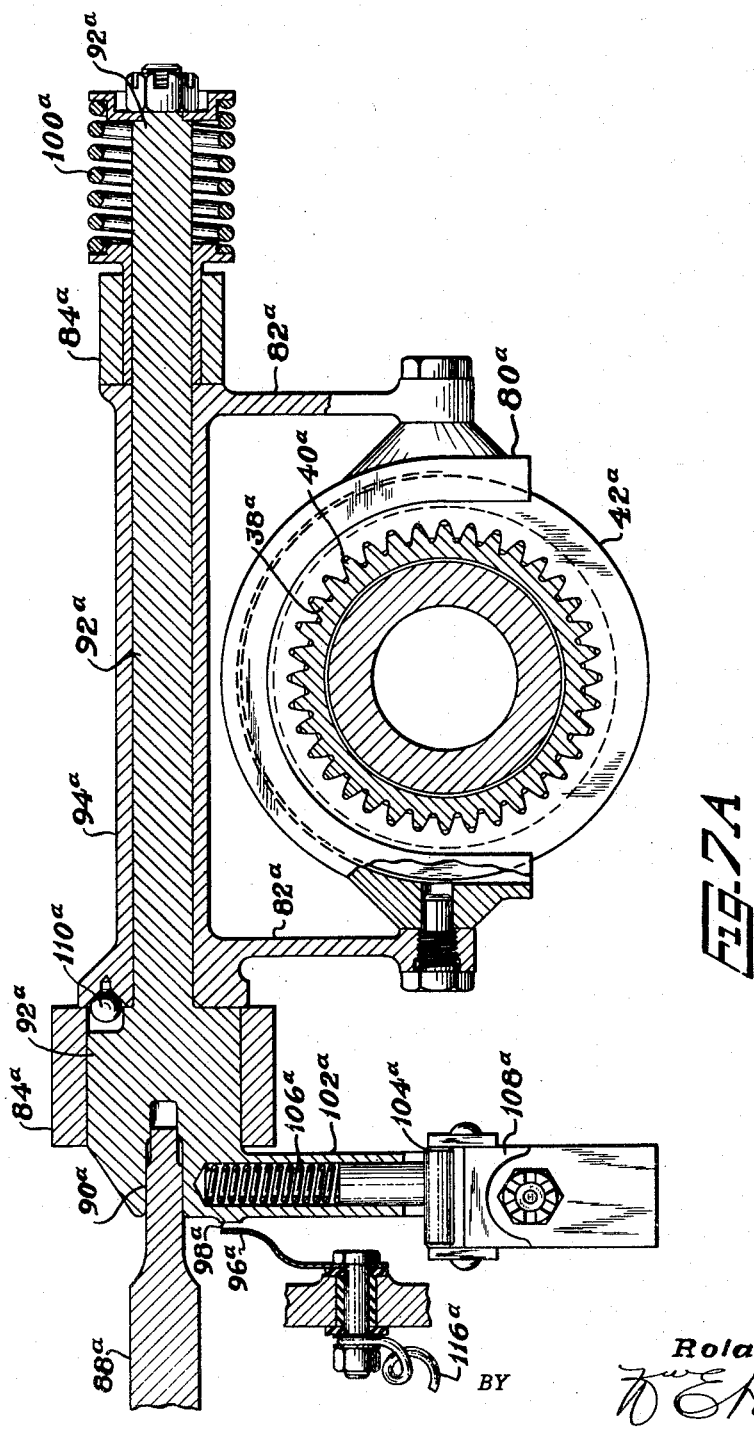

Patented May 21, 1946

2,400,538

UNITED STATES PATENT OFFICE 2,400,538

TRANSMISSION

Roland Chilton, Ridgewood, N. J., assignor to Wright Aeronautical Corporation, a corporation of New York Original application October 14, 1942, Serial No. 462,059. Divided and this application April 12, 1943, Serial No. 482,790

21 Claims. (Cl. 192—48)

This invention is a division of my co-pending application Serial No. 462,059, filed October 14, 1942, and relates to gear shift mechanisms in general and is useful wherever multiple torque and speed ratios are desired for the transmission of power between driving and driven shafts.

As will appear later, one feature of the invention is that the new concept is applicable to a great number of speeds or gear shift stations by the mere addition of closely spaced gears without other change in the main operating elements which of themselves are adapted to any desired number of speeds. In the specific embodiment chosen for illustration, the driving or input shaft is the slow speed member; the various gear stations affording different speed-up ratios to the driven shaft which, in this case, drives a supercharger impeller. It will be obvious, however, that the high speed shaft could be used as the driving member for use as a reduction gear of various ratios.

Another novel feature of the invention resides in the provision of an especially compact gear shift organization wherein a plurality of coaxial toothed rings are arranged in a closely spaced series comprising a desired number of gear shift stations, each ring being driven at a different speed by a plurality of constant-mesh layshaft gears. To disengage and engage respective tooth rings to form a positive toothed-clutch drive, a helically mounted and axially shiftable toothed collar is provided. Movement of the collar is automatically responsive to the energization of a fluid coupling or its equivalent which is controlled by novel means; first to bring the toothed coupling to zero torque for disengagement, and then to effect synchronization for automatic engagement of the next gear ratio, whereupon the fluid (or other) coupling is automatically de-energized by control interconnections.

I am aware that transmissions which shift automatically in response to changes in speed or torque between the driving and driven shafts are old in the art, as in (two-speed) throttle-responsive automobile overdrives. The present invention includes a new and improved speed-responsive gear shift mechanism applicable to any number of speeds and is also usable where the shift is effected by cutting the driving power, as by shutting off the ignition or throttle. However, a further and important feature of the preferred embodiment of the present invention resides in the use of a normally disengaged coupling engageable to enforce the speed and torque changes which produce the automatic shift without interrupting the power flow and without operating any throttle, ignition or other interconnection with the power means. In this system, all these functions are self-contained within the transmission unit itself and operate independently of any change in speed or power output of the driving means.

I am also aware that ratchet operated screw-shift means, responsive to changes in relative speed and/or torque direction are old in the art, but the means herein disclosed is a novel and simplified structure suitable to any number of speeds, in accordance with certain of the objects of the invention.

In the drawings:

Fig. 1 is an axial section through a four-speed embodiment designed for a supercharger drive;

Fig. 2 is an enlarged fragmentary axial section of the shift elements;

Fig. 3 is an outside view of the shift collars;

Fig. 4 is a view taken along the line 4—4 of Fig. 3;

Fig. 5 is an outside view of the shift collars on their shaft;

Fig. 6 is an end view of the driven shaft;

Fig. 7 is an end view in section on the line 7—7 of Fig. 1 through the control mechanism;

Fig. 7A is an end view, similar to Fig. 7, of a modification;

Fig. 8 is a sectional view of the control locking detent along the line 8—8 of Fig. 7;

Fig. 9 is a section on the line 9—9 of Fig. 7;

Fig. 10 is an enlarged view on the line 10—10 of Fig. 2; and

Figs. 11, 12, and 13 are sectional views, respectively, on the lines 11—11, 12—12 of Fig. 2, and line 13—13 of Fig. 3.

Referring first to Fig. 1, 10 designates an engine crankshaft mounted in a crankcase 12 on bearings such as indicated at 14. Splined at 16 to the crankshaft 10 is a planet carrier 18 having journals 20 on which are mounted planet pinions 22 engaging a fixed ring gear 24, and planet gears 26 meshed with a sun gear 28 rigid with the left-hand half of a conventional fluid coupling housing 30.

A coupling cover 32 is rigid with the housing 30 and carries a gear 34. By the parts so far described, the coupling housing 30 is at all times driven at somewhat higher speed ratio (in this case nine times engine speed) than the highest speed ratio provided by the gear shift mechanism (in this case seven times engine speed). The coupling 30 has a runner 36 shown integral with a driven shaft 38, seen in enlarged detail in Figs. 2 to 6. The runner-driven shaft 38 is equipped with axial driving splines 40 (Figs. 5 and 6) on which a locking collar 42 is splined and free to slide. Cut on top of the driving splines 40 are helical grooves 44 on which is freely splined a toothed clutch ring 46 having helical splines 47 and clutch teeth 48. The collar 42 and ring 46 have mating end jaws 50 and 52, best seen in Fig. 3.

The jaws 50 and 52 have axial driving faces 54 and 56 and helical backs 58 and 60 having the same lead of helix as the helical shifting splines 44. In this specific instance, the lead is, for example, 12", and there are thirty-two of the jaws 50 and 52 so that rotation of the helically mounted collar 46 by the amount of one tooth results in an axial motion of $12/32 = 3/8$". This axial movement of $3/8$" is the same as the spacing of the various gear stations later to be described.

Now suppose that jaws 50 and 52 be fully engaged as shown in Figs. 1 and 5. In these circumstances it will be clear that the ring 46 is locked against rotation in the direction of its associated arrow (Fig. 5) by the engaging axial faces 54 and 56, remembering that the driving splines 40 of the locking collar 42 are also axial. However, it will also be seen that, should the toothed ring 46 be rotated against the direction of its associated arrow, it will move leftwardly (Figs. 1 and 5) along the helical splines 44 without movement of the collar 42, because the helical lead of the backs 58 and 60 of the jaws is the same as that of the helical splines 44. In other words, if a light leftward pressure be put on the locking collar 42 during this clockwise rotation of the toothed ring 46, as viewed from the left of Fig. 5, the collar 42 will not move until such rotation has brought the jaws point-to-point, whereupon the locking collar 42 will snap to the left by suitable spring means hereinafter described, re-engaging the parts one tooth circumferentially and (in this instance) $3/8$" axially from the original position.

To complete this preliminary explanation of the coaction of collar 42 and ring 46, suppose that a substantial torque is imposed on the axial faces 54 and 56 by attempting to rotate the toothed ring 46 and the locking collar 42 in the directions of their respective arrows (Fig. 5), while a light axial pressure to the right is exerted against the locking collar 42. Under these circumstances, the locking collar 42 will not move to the right, because of the driving friction on the jaw faces 54 and 56 and axial splines 40, but if the torque be gradually relaxed, there will arrive a point (called "zero" torque) where the locking collar 42 will snap to the right, out of engagement, and assume the position shown in Fig. 3. Actually, the movement of the locking collar 42 is normally limited by the control mechanism, later to be described, to be only $3/8$" for each shift increment so that the right hand movement will bring the jaws 50 and 52 to clear. If now the torque is again applied in the direction of the arrows (Fig. 5), it will be seen that the toothed ring 46 will advance to the right until it is arrested by full reengagement of the jaws 50 and 52, the ring having again rotated one jaw spacing ($1/32$ of a turn) on its helical splines and advanced to the right $3/8$" to the next gear ratio station. The operations just described represent the functioning of the novel shift system of this invention but, in the actual operation, the forces above represented as mere manipulation are provided by the admission of working fluid (oil) to the fluid coupling 30 and 36 and subsequent automatic cut-off responsive to the resulting motions of the locking collar 42 by inter-connected control means, later to be described.

Before describing the control means, a description of the gearing which provides the various ratio stations should be given. The gear 34 previously stated to be rigid with the coupling housing 32 and rotating, in this case, at nine times engine speed, is engaged by a plurality of surrounding layshaft gears 62 which carry with them in their rotation the gears 64, 66, 68 and 70 (four of them as this is a four-speed transmission). Four gears 72, 74, 76, and 78 are meshed with the respective layshaft gears and each of these gears has similar internal clutch teeth 73, 75, 77, 79 (Fig. 2) spaced axially one shift-increment ($3/8$") apart, and these teeth are serially engageable by the teeth 48 of the toothed ring 46, thus providing a different driven speed for engagement with each respective sun gear.

The gear-shifting control, it will be noted, is through the locking collar 42 which in turn is operated by a draw-collar 80 such as that shown in Figs. 1 and 7. The collar 80 is moved axially by rocking a forked-lever 82 mounted in suitable bearings 84 in a housing 86 (Fig. 1), in which the lay-shaft gears are also mounted. The operator's control is by a primary control shaft 88 which has a tongue connection 90 with a shaft 92 passing through the hub 94 of the fork lever 82 and operating a coupling-oil control valve 96 as follows: The valve 96 (Fig. 7) cooperates with a seat 98 formed in the lever hub 94 and is normally kept tightly seated by righthand pressure from a spring 100. The shaft 92 has a rigid dependent lever 102 at its lefthand end and this lever 102 has a detent 104 loaded downwardly by a spring 106 against a four notch detent rack 108 (see also Fig. 8) secured to the housing 86. The spacing of the notches in the rack 108 is such as to arrest the draw-collar 80 and locking collar 42 at $3/8$" intervals to correspond to each gear station.

Motion from the control shaft 92 is transmitted to the fork lever 82 through the action of balls 110 engaging circumferentially spaced conical pockets 111 formed in the end of the lever hub 94 (Fig. 9) and in the opposed shoulder 93 of the control shaft 92, respectively. It will be seen that the valve 96 has an extension 112 where it is threaded on the righthand end of the control shaft 92 whereby the parts are adjusted axially during assembly so that there is very slight rotational clearance at the balls 110 while the spring 100 holds the valve 96 firmly on its seat. It will further be seen that, should the prime operator's control 88 be moved to throw the spring detent 104 into the next notch, the control shaft 92 must move equally, but should there be resistance to the motion of the draw-collar 80, the control lever 82 will remain stationary, whereupon the action of the balls 110 in their conical pockets will draw the control shaft 92 bodily to the left against the bias of spring 100 and open the coupling-oil valve 96 (as shown in Fig. 9). The bias of spring 100 will be transmitted through the shoulder 93 of shaft 92 to the balls 110 in their conical pockets, as illustrated in Fig. 9, and the reaction of balls 110 against the conical walls of these pockets is transmitted through lever 82 and collar 80 to provide a light axial shifting pressure on collar 42. Oil pressure is at all times supplied to the left bearing 84 at 85 and thus to the lefthand side of the valve 96 (see arrows), the oil being normally shut off at this point. When the valve is opened, however, the oil proceeds to the righthand bearing 84 of the control shaft and through a duct 116 which communicates with the coupling 30, 36 as seen at 118 in Fig. 1. This fluid coupling has a bleed orifice 120 at its periphery whereby it normally runs empty, but the rate of oil flow when the valve 96 is open is sufficient to progressively fill the coupling in spite of this bleed at the hole 120.

It is important to note that the locking collar 42 is limited to axial motion (no relative rotation on the axial driven shaft splines 40) and that no matter what axial pressure should be put on the locking ring 42, it cannot of itself move the toothed ring 46. Leftward pressure merely locks this ring upon its helical splines while righthand pressure will result in righthand movement of the locking collar 42 alone when the force resulting from the control spring 100 and balls 110 is sufficient to overcome the driving friction at the axial jaw faces 54 and 56 and at at the splines 40. The shifting pressure available at the collar 42 from the spring 100 is deliberately made of small value so that the collar 42 will not follow righthand urging from the control until the torque load on the jaws and splines is virtually zero whereupon the action of the spring 100 and balls 110 is to re-aline the conical pockets 111 thereby snapping the collar smartly one increment to the right, thus instantly closing the valve 96 and promptly cutting off the oil supply to the fluid coupling 30, 36 which then proceeds to drain through the bleed hole 120, whereby the driven shaft slows down until the jaws 50 and 52 are reengaged and the drive resumed by the next lower gear.

Recapitulating this action, it will be noted that the action of the balls 110 in opening the valve 96 is the same for either direction of motion of the control lever, i. e., whether it be moved to initiate a shift to a higher ratio station or to a lower. It is also repeated that in operation (with driving load on the parts) the locking collar 42 will not immediately follow the motion of the control shaft but will remain stationary whereby the first effect of moving the control lever one notch is merely to open the valve 96 thereby starting admission of oil to the coupling while maintaining a light axial pressure on the collar 42 which is prevented from responding by the driving torque load. Also, any leftward pressure on the collar merely locks the ring 46 on its helical splines. However, as the coupling fills, more and more of the torque is taken off the jaws 50 and 52 by the fluid coupling (bearing in mind that the driving member of the coupling is always running faster than the driven member). In other words, as the coupling fills, the gears in use are progressively relieved of torque until the instant when all of the drive is taken through the coupling at which instant the driven shaft 38 will start to overrun the gear in use. This results in the toothed ring 46 starting to wind itself leftwardly along its helical splines 44. Now, should the light spring pressure of the shift collar 80 on the locking collar 42 be to the right, i. e., should a shift to the lower speed have been initiated, the collar will instantly snap to the right, restoring the valve 96 to its closed position and cutting off the coupling oil. The coupling then proceeds to drain, allowing the speed of the driven shaft to fall, during which time the toothed ring 46 will wind itself along its helical spline as hereinafter described, until it re-engages the collar which has moved its ⅜" increment as previously described. Thus, on a shift "down," the oil supply to the coupling is cut instantly zero torque is reached thereby allowing the speed of the driven shaft to fall and permit the clutch teeth to mesh with the clutch teeth on the next lower drive-ratio gear upon speed synchronism therewith.

For a shift up, requirements are different, and herein resides one important feature of the invention. It is now necessary, since the coupling must speed up the driven shaft, that the oil supply to the coupling continue after the zero torque point has been reached and until the driven shaft has been speeded up to the required amount, i. e., until speed synchronism has been attained between the ring clutch teeth 48 and the clutch teeth of the next higher drive-ratio gear. The special construction of the jaws 50 and 52 provides for this, as already described, because when rotated clockwise, as viewed from the left of Figs. 1 and 5, the toothed ring 46 moves one complete shift increment to the left without any motion of the locking collar 42, whereby the valve 96 stays open until the points of the jaws are reached and the collar snaps into the toothed ring 46 and locks it, at which instant the oil supply to the coupling is cut off, and the coupling drains through its bleed hole 120 and the torque again devolves on the gear system to the driven shaft 38 through the toothed ring 46, locking collar 42 and their engaged jaws, all as previously described.

The action of the toothed ring 46 in winding up and down its helical splines is controlled exclusively through oppositely extending pawls 122 and 124 pivoted on either side of the teeth 48 of the ring 46, better seen in the enlarged views of Figs. 2, 10, 11, 12 and 13. These pawls are outwardly biased by resilient fingers 123 and 125. When the teeth 48 are at any one gear station, i. e., engaged with the mating teeth of one of the sun gears, the pawls are clear of adjacent sun gear clutch teeth, as shown in Fig. 1. However, as seen in Fig. 2, when the tooth ring 46 is in process of shift, i. e., in "neutral" between two stations, then the pawls 122 and 124 engage and have opposite one-way ratchet actions with the respective adjacent sun gear clutch teeth. Under this condition, the toothed ring 46 will be automatically moved along its helical mounting spline into engagement with whichever adjacent sun gear it should next be synchronized with in speed. Thus, if we imagine the toothed ring 46 in any one neutral position and the fluid coupling 30, 36 as still filling, the latter will be accelerating the driven shaft 38 towards synchronism with the next higher gear which will be engaged automatically by teeth 48 of ring 46 when synchronism is reached as a result of the action of pawl 124 and the helix. Conversely, should the coupling be emptying, the shaft will be decelerating and when synchronism is reached with the adjacent lower speed sun gear, the toothed ring 46 will be drawn along its helical spline into engagement with this adjacent lower speed sun gear teeth by the automatic action of the pawl 122 and the helix. It should be noted that the engaging ends 126 and 128 of the pawls 122 and 124, respectively, are in alinement with the face of a clutch tooth 48 as best seen in Figs. 12 and 13. This construction insures alinement of ring clutch teeth 48 and the desired clutch teeth 73, 75, 77 or 79 as the pawl 122 or 124 operates to bring these teeth into mesh.

In brief, when the control shaft lever 102 is thrown to an adjacent lower speed notch, the locking collar 42 does not immediately follow, whereby relative motion at the balls 110 opens the valve 96 and starts to fill the coupling. When sufficient oil has entered the coupling to enable it to relieve the gear system of driving torque, then the locking collar snaps to the right shutting off the oil supply. In case of a shift to a higher ratio, the locking collar 42 does not move until the shift is complete, i. e., until the tooth ring 46 has attained synchronization with and fully engaged the new gear at which time the jaws 52 of ring 46 have advanced one spacing and the spring 100 snaps the locking collar jaws 50 into re-engagement, thus shutting off the oil supply. It is important to keep in mind that the locking collar 42 does not shift the toothed ring 46. It merely anticipates or follows up the shifting of this ring which results from the helical splines and ratchets as the gears are brought to zero torque and synchronized to their new speed ratio by the automatically controlled emptying of the coupling, which is responsive to the movement of the locking collar 42 cutting the oil supply at the different phases of the shift as required for up-shift and down-shift respectively.

The rate of filling of the coupling and, therefore, the time taken in shifting is adjustable by means of a needle valve 130 (Fig. 7) in the coupling oil passage 116. Should this valve be set wide open, the coupling will fill rapidly and the sequence of actions described at length may be completed in a fraction of a second. On the other hand, if slower completion of the shift is desirable, the bleed valve 130 may be adjusted accordingly.

In this example, the slipping-clutch means, by which the gears are relieved of torque and whereby synchronization with the new ratio is achieved, has been described as a fluid coupling. The invention, however, is not limited to this particular embodiment. For example, a friction clutch loaded by centrifugal force of oil behind a piston may be used, the oil quantity being automatically controlled in the same way as described in the case of the fluid coupling.

While the drawings show four speeds, it will be seen that additional ratio stations require merely additional layshaft gears and sun gears and additional notches in the detent rack 108; the fluid coupling, the tooth ring 46, the collar 42, and the control mechanism and other parts remaining unchanged. It will also be seen that this invention provides a simple shift system where the clutching, synchronizing and gear shifting functions are all automatically correlated in simple unitary mechanism having a single-lever control. This is in contra-distinction to conventional automobile gear shifts, for instance, where a shift lever, an engine throttle lever and a clutch lever have to be properly coordinated by the operator. It will also be seen that in this system the torque to the driven member is continuous even during the shifting instead of the power means being completely disconnected during each shift. It is also pointed out that the fluid or other coupling is working only at time of shift (say one second more or less). It does no work during normal running when it is empty, in the case of the fluid coupling, or completely disengaged in case a friction clutch is used. All these results are in conformity with objects of the invention.

In Fig. 7A there is disclosed a modification of the control mechanism for use with the novel screw shift mechanism and in which the shift is effected by cutting off the driving power, i. e., by shutting off the ignition as illustrated in Fig. 7A or by shutting off the engine throttle. The control mechanism of Fig. 7A is quite similar to that of Fig. 7 and similar or analogous parts have been designated by the same reference numeral with the addition of a subscript $a$. The primary distinction of this modification is that the fluid coupling 30 and its control valve 96 are eliminated and an ignition switch 96a is substituted for the fluid valve 96. When control handle 88a is operated in either direction, spring 100a through balls 110a and their conical seats imposes a light shifting pressure in the appropriate direction on locking collar 42a through lever 82a. At the same time the balls 110a draw the control shaft 82a to the left to close switch 96a to thereby short circuit a conventional magneto ignition system. This operation of the control mechanism to open and close switch 96a is similar to the operation of the control mechanism of Fig. 7 to close and open valve 96. Switch 96a when closed grounds magneto primary wire 116a at contact 98a to shut off the ignition and slow down the engine.

Now, suppose it is desired to effect an upshift; control handle 88a is operated to impose a leftward pressure on locking collar 42a and at the same time this operation of the handle 88a closes switch 96a to shut off the ignition. The engine will slow down until the gear driving torque is substantially zero and after which point the further decreasing engine speed will shift ring 46 into mesh with the clutch teeth of the next higher gear ratio through the action of pawls 124 and helix 44, just as previously described. Locking collar 42a will then snap to the left, and spring 100a will restore switch 96a to its normal open position to again render the ignition effective. Similarly, to effect a down-shift, control handle 88a is operated to impose a light rightward pressure on locking collar 42a and at the same time this operation of handle 88a closes switch 96a to shut off the ignition and slow down the engine. As soon as the gear driving torque is substantially zero, locking collar 42a will snap one gear station to the right and spring 100a will immediately return switch 96a to its normally open position to again render the ignition effective and accelerate the engine. The acceleration of the engine will shift ring 46 to the right into engagement with the next lower gear ratio through the action of pawls 122 and helix 44, as previously described in connection with Fig. 7. Obviously, the above control for decelerating and accelerating the engine to effect the shifting operation, could be accomplished just as well by a control of the engine throttle instead of the ignition.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission, in combination, a drive member having axial splines and helical splines, a toothed clutch ring movable along said helical splines and having side jaws, a locking collar having companion jaws and slidable along said axial splines to drivably lock said ring against movement in at least one direction along said helical splines at spaced stations along said member, and gears having clutch teeth stationed for successive engagement by the clutch ring teeth.

2. A transmission comprising, in combination, a series of axially spaced gear rings having different speeds and provided with similar clutch teeth, a toothed clutch ring serially engageable therewith, a drive member on which said toothed clutch ring is helically mounted, said member being provided with axial splines, and a locking ring mounted on said axial splines, said rings having jaws mutually engageable to lock each ring against movement in at least one of its directions of movement at stations along said shaft corresponding to the spacing of the clutch teeth of said gear rings.

3. In combination, a pair of rings having mutually engageable jaws, one ring having clutch teeth and helical shifting splines and the other ring having axial driving splines, and a drive transmitting member having corresponding helical and axial splines engaging the respective rings whereby each ring may be locked against movement in at least one of its directions at stations along said member having a spacing equal to the lead of said helix divided by the number of its jaws.

4. In a transmission, a series of axially spaced gears affording different speed drive ratios and each provided with similar clutch teeth, a drive member having a set of helical splines and another set of splines inclined relative thereto, a toothed clutch ring selectively engageable with said gears and slidable along one of said sets of splines, and a locking ring slidable along the other set of splines, said rings having cooperating jaws capable of locking said rings against relative rotation in at least one direction at spaced intervals along said member corresponding to the spacing of said gears.

5. In combination, a shaft, a pair of members having axial and helical coaction respectively with said shaft and mutually with each other thereby defining increments through which either member must be shifted before the other is able to follow-up said shift.

6. In combination, a shaft having one set of splines and another set of splines inclined relatively thereto, and a pair of members each slidable along one of said sets of splines respectively, said members having cooperating jaws capable of locking said members against relative rotation in at least one direction at spaced increments along said shaft.

7. In combination, a shaft having a set of helical splines and another set of splines inclined relatively thereto and a pair of members each slidable on one of said sets of splines respectively, said members having cooperating jaws each having one face conforming to one set of splines and the other opposed face conforming to the other set of splines.

8. In combination, a shaft having axial and helical splines, a screw shift selector member and a locking member slidable on said helical and axial splines respectively, said members having cooperating jaws formed with driving faces engageable against relative rotation in one direction and formed with helical backs having a lead corresponding to the lead of said helical splines thereby permitting screw-shift of said selector member away from said locking member.

9. In combination, a shaft having a set of helical splines and another set of splines inclined relatively thereto, and a pair of members each slidable on one of said sets of splines respectively, said members having serrations engageable to prevent relative rotation in one direction but permitting relative sliding and relative rotative movement in the other direction.

10. In combination, a shaft having a set of helical splines and another set of splines inclined relatively thereto, and a pair of members each slidable on one of said sets of splines respectively, said members having cooperating serrations so shaped that one of said members may shift along its splines away from the other of said members until said serrations pass each other before said other member is able to follow-up said shift.

11. In combination, a shaft having a set of helical splines and another set of splines inclined relatively thereto, and a pair of members each slidable along one of said sets of splines respectively, said members having cooperating jaws each having opposed faces respectively conforming to said sets of splines, whereby either member is incapable of shifting the other member but either member may shift along its respective splines away from the other member which other member is prevented by said jaws from following-up said shift movement until the jaws of said members pass each other.

12. In combination, a shaft having a helical set of splines and another set of splines inclined thereto, and a pair of members mounted on respective splines and having serrations engageable against relative rotation in one direction, said splines and serrations permitting one member to advance one serration before freeing the other member to follow-up said advance.

13. In combination, a shaft having a helical set of splines and another set of splines inclined thereto, and a pair of members each shiftably mounted on one of said sets of splines respectively, said members having cooperating serrations defining screw-shift increments and having opposed faces respectively conforming to said sets of splines whereby one of said members may screwshift one increment from the other before the latter is able to follow-up said shift.

14. In a transmission, a series of axially spaced gears having similar clutch teeth, a drive member having a set of helical splines and a set of axial splines, a shift member slidable along said helical splines for selective engagement with the clutch teeth of said gears, an integral locking member slidable along said axial splines and engageable with said shift member for locking said shift member against movement in at least one direction along its splines at spaced stations along said drive member corresponding to the spacing of said gears.

15. In a transmission, a drive member having a set of helical splines and a set of axial splines, a shift member slidable along said helical splines, and an integral locking member slidable along said axial splines into and out of engagement with said shift member for locking said shift member against movement in at least one direction along said helical splines at spaced stations therealong, said locking member being capable of locking said shift member at a number of stations limited only by the range of movement of said shift and locking members.

16. In a multi-speed transmission, a shaft-like member having helical splines and other splines inclined relatively thereto, a shift member slidable along said helical splines, and an integral locking member engageable with said shift member and said other splines and being slidable lengthwise of said shaft-like member for locking said shift member against movement in at least one direction along its helical splines at three or more spaced stations along said shaft-like member.

17. In a multi-speed transmission, a shaft-like member having helical splines and other splines inclined relatively thereto, a shift member slidable along said helical splines, and an integral locking member engageable with said shift member and said other splines and being slidable lengthwise of said shaft-like member for locking said shift member against movement in at least one direction along its helical splines at spaced stations along said shaft-like member, the engaging surfaces of said shaft-like member, shift member and locking member with each other being of such geometry that the number of said stations is limited only by the range of movement of the shift and locking members lengthwise of the shaft-like member.

18. In a multi-speed-ratio transmission, a drive transmitting member having helical spline and spline means inclined thereto, a speed-ratio-shift member slidable along said helical spline means, and an integral locking member engageable with said shift member and with said second-mentioned spline means for locking said shift member against movement in at least one direction along said helical spline means at spaced stations therealong.

19. In a multi-speed transmission, a shaft-like member, a plurality of gears spaced along said shaft-like member, a shift member movable along said shaft-like member for selective engagement with said gears to provide said transmission with a plurality of speed ratios, and locking means movable along said shaft-like member to lock said shift member against movement in at least one direction along said shaft-like member at spaced stations therealong corresponding to the spacing of said gears with said shift member in engagement with one of said gears at each of said stations, said shaft-like member, shift member and locking means each having surfaces engageable with the other two of such form that the number of said stations may be increased merely by providing for an increased range of movement of said shift and locking means along said shaft-like member.

20. In a transmission having a driving shaft and a driven shaft adapted to be operatively associated at a plurality of different speed ratios, a speed-ratio shift mechanism comprising a shift member, a locking member, each of said members having different relative angular co-action with one of said shafts, said members also being adapted for mutual co-action so that either member must be shifted through a predetermined increment of movement relative to said shaft before the other can follow-up said shift with a corresponding increment of movement relative to said shaft.

21. In a multi-speed-ratio transmission, a drive transmitting shaft having a set of helical splines and having substantially axial splines, speed-ratio shift means movable along said helical splines, locking means slidable along said shaft and engageable with said shift means and said axial splines for locking said shift means against movement in at least one direction along said helical splines at spaced stations along said shaft, the engaging surfaces of said shaft, locking means and shift means with each other being of such form that the number of said stations may be increased merely by providing for an increased range of movement of said shift and locking means in engagement with their respective splines.

ROLAND CHILTON.